United States Patent Office 2,840,456
Patented June 24, 1958

2,840,456

PROCESS FOR MAKING ALKALI METAL SILICATES

William T. Gooding, Jr., Painesville, Ohio, assignor to Diamond Alkali Company, Cleveland, Ohio, a corporation of Delaware No Drawing. Application January 4, 1954
Serial No. 402,163

15 Claims. (Cl. 23—110)

This invention relates to the production of technically anhydrous crystalline alkali-metal silicates. More particularly, the invention is concerned with a new process of making materials wherein the ratio of, for example, $Na_2O:SiO_2$ is between 1.65 to 2.25:1; of especial interest is material of the othosilicate ratio, i. e., 2:1, or approximately so, for example, about $$1.85-2.10 Na_2O:1SiO_2$$

The invention is concerned also with new products made in accordance with the process. The invention contemplates that the alkali portion of the compositions under consideration may be any of the alkali metals, including lithium, sodium, potassium, cesium, or rubidium, though of course, the recognized commercial compounds are usually sodium silicates. Hereinafter, reference will be made only to sodium compounds, it being understood that all alkali metals are included.

At present, there are several known products described as technically anhydrous sodium silicates wherein the ratio of $Na_2O$ to $SiO_2$ falls within the range contemplated by this invention. Also, various processes are known for their manufacture. A number of important characteristics have been established by the consumers of these materials which are necessary for satisfactory performance. Generally, it is quite desirable that these materials be readily soluble. Primarily, this is because they are used in such large quantities that the time required for dissolution becomes of considerable importance. Another property very desirable in these materials is high melting point since they are used extensively in high temperature lubrication. They lubricate more efficiently in solid phase; accordingly, a significant increase in melting point renders them more widely usable. Presently known products may be said to be generally satisfactory in these respects, but, as will appear, the products of this invention are much improved as to both solubility and melting point over the known products.

In addition to the foregoing properties, it is particularly desirable that the products be non-deliquescent, and this invention is especially concerned with this property since products presently known are generally considered to be unsatisfactory in this respect. Because of their deliquescent character, great difficulty is encountered by the producer and the user of known products.

Initially, presently known products are formed as technically anhydrous sub-divided free-flowing materials. However, immediately after formation, if they are exposed to moist atmosphere, so much water is taken up within a short time that the products become either caked or quite wet and slushy, in either of which forms, of course, they are not free-flowing solid materials. As illustrative of the conditions that are experienced in handling these materials, it is found by exposing three different similar products to the atmosphere, all of which were stated by their manufacturers to be anhydrous orthosilicate, that within the span of 24 hours, they had increased in weight from about thirty-three percent to about fifty percent. In two cases, which showed an increase in weight of about one-third, the products had become wet and caked. The product which had increased in weight by about fifty percent was a slushy mass. These products were affected by the increase in water content long before the passing of 24 hours; they had begun to agglomerate visibly in a few hours and were unsatisfactory for their intended use. Water absorption at this rate requires that the product be packaged in expensive sealed waterproof containers, substantially immediately upon formation, otherwise, the product not only becomes difficult to package but its ultimate use is seriously impeded. Preferably, packaging is carried out in a dry atmosphere, and shipping and storage containers are water-proof. The consumer must store opened containers under dry conditions or the contents will absorb sufficient water to agglomerate. Once the material has agglomerated, great difficulty is encountered in removing it from its package and in bringing it into solution; for all practical purposes, dissolution at such time may be impracticable. Thus, products which are subject to these disadvantages are of serious concern to both the producer and the consumer.

It is not believed that others concerned with this problem have reported its solution prior to this invention. However, it is a special advantage of this invention that the products produced thereby are greatly improved as regards the property of deliquescence. Indeed, it may be said that this invention, for practical purposes, eliminates all difficulty in these materials due to deliquescence.

Attempts which have been made heretofore to prepare essentially anhydrous sodium silicates have resulted in several different processes that are recognized by the art. In general, these processes differ widely although all of them employ silicon dioxide and sodium oxide-containing materials. Generally speaking, in manufacturing materials of the character herein, it is desirable to avoid high temperatures because of the necessary heat energy and special high-temperature equipment which such processes require. Additionally, where the temperatures are sufficiently high to produce a melted mass, the disadvantage of corrosive effects of high temperature melts upon equipment are encountered, which effects necessitate expensive equipment in order to avoid frequent equipment replacement. Moreover, corrosion of the equipment introduces impurities into the product. Additionally, some of the known processes employ anhydrous caustic as the ingredient for supplying the $Na_2O$ content. The use of anhydrous caustic is to be avoided wherever possible because of its increased cost over sodium hydroxide solutions. The increase in cost results from the expense of dehydration and special shipping requirements peculiar to anhydrous caustic. For example, it is not possible to ship anhydrous caustic in loose form in tank car quantity since, due to its high melting point, it cannot readily be removed from the car; instead, it must necessarily be shipped in small steel drums so that it can be handled conveniently at the point of use. In contrast to this, 70% sodium hydroxide, which melts at about 65° C., and similar solutions may be shipped in bulk by tank car fitted with internal heating coils for heating the mass to its liquid form so that it will flow.

In some of the known processes, the products must be reduced to particle size at the conclusion of the reaction because of the fact that a solid cake is produced instead of a discrete mass. This, of course, results in an undesirable additional step in the process.

In contrast to the known processes, the new process of this invention is free of all such difficulties. The process according to this invention is a low temperature process and it employs sodium hydroxide solutions. The reaction results in products composed of discrete crystalline particles that do not require extensive treatment thereafter to make them useable for their intended purposes.

Another advantage which the process of this invention combines with other advantages is that it results very consistently in the formation of crystalline products rather closely approaching the orthosilicate ratio. Materials of this ratio have considerable market attractiveness. As is well known, it is quite difficult to cause crystallization of a sodium silicate-caustic mixture to a discrete mass having an $Na_2O:SiO_2$ ratio of or near 2:1. Experience which has been gained heretofore reveals that a liquid mass, from which crystals of about the orthosilicate ratio might be expected to crystallize, quite commonly crystallizes to a product far afield from this ratio; oftentimes, for reasons not understood, no crystallization takes place. Furthermore, an additional and serious difficulty is that portions of the same liquid mass can seldom be caused to provide crystals of the same ratio, even though the portions are handled under identical conditions. There does not seem to be any reason why the product which is sought should not form, and, therefore, prudence dictates that no attempt at explanation be offered in conjunction with this invention.

The present invention, as indicated above, advances the art to a solution of this problem. Sustained operation of the present process consistently produces a product in which the $Na_2O:Sio_2$ ratio is between about 1.65–2.25:1. Furthermore, where desired, the process may be practiced in such manner as to provide, consistently, products having a ratio of about 1.85 to 2.10:1. Since all of the crystalline materials that are formed by the process are useful, and since products having the very useful approximate orthosilicate ratio may be regularly produced, the process is especially attractive because of the economic advantages it affords in supplying consumers who do not require a material of a precise ratio. The economic advantage, of course, results from the extreme simplicity of the process in contrast to more complex processes where the object is to produce a material of the exact ortho ratio.

A further advantage which should be mentioned is that the process eliminates the requirements for precise balancing of respective quantities of starting materials since, as will appear hereinafter, the process may be operated within rather wide limits provided that certain specific preferred conditions are observed. Moreover, the latitude in starting proportions permitted by the process is not outweighed by the restrictions imposed by preferred conditions of the process, because these conditions actually are in themselves distinct advantages as compared with the advantages of other known processes.

It has been found, according to this invention, that materials having a molecular ratio of about

$$1.65-2.25Na_2O:1SiO_2$$

more especially, a ratio of about $1.85-2.10Na_2O:1SiO_2$, may be simply and quickly prepared by combining a sodium silicate of the well-known waterglass family, suitably, a silicate of the formula $1Na_2O:1-3.4SiO_2$, for example, a material commercially available under the designation grade 42 silicate, which latter silicate is a water solution averaging by weight about thirty-eight and eight-tenths percent solids as $1Na_2O:3.22SiO_2$ (weight ratio), and a caustic soda solution which may vary in concentration from about 55% to about 74%, preferably, however, within the range of about 70% to about 73%. The lower limit of 55% is specified because where concentrations appreciably lower than this are employed, the crystalline mass as sought by the invention becomes very difficult to constitute. For convenience, the starting materials are sometimes referred to herein as waterglass and 73% caustic soda, this concentration being specified only because it is readily available as a commercial product.

Waterglass and a caustic soda solution are combined to provide an $Na_2O:SiO_2$ ratio of at least about 3:1. Actually, the initial $Na_2O:SiO_2$ ratio of the starting mixture may vary from 3:1 to infinity:1. However, this would include combinations having necessarily impractically large volume requirements of solutions and correspondingly lower yield of desired crystalline material per unit volume of solution. A more suitable ratio and the preferred range for the practice of the invention is the combination of waterglass and a caustic soda solution to provide an $Na_2O:SiO_2$ ratio of from about 3.0 to 6.0:1. The water content of the mixture varies with the concentration of the starting materials. Mixtures are still more preferred containing $Na_2O$ and $SiO_2$ in the ratio about 3.50–4.50:1, since it is found that better size crystals are formed which are easier to handle; also, it appears that the $Na_2O:SiO_2$ ratios of the products from such mixtures are more consistently maintained between the desired 1.85–2.10:1 ratio. A preferred formulation is illustrated by a mixture containing, by weight, about 9.8% $SiO_2$, 42.7% $Na_2O$ and 47.5% $H_2O$. As may be calculated, the $Na_2O:SiO_2$ ratio in this mixture is 4.22:1.

Suitably, the caustic and sodium silicate solutions are mixed together at a temperature above about 90° C. The mixing temperature may be considerably higher, for example, 150°–160° C. or higher. However, temperatures of about 90° to 135° C. are suitable and preferred. After the materials have been thoroughly mixed, the mixture is cooled to between about 65° and 90° C., preferably, about 75° to 85° C., whereupon crystallization begins. Crystallization is complete within not more than about two hours, usually within an hour. When crystallization is complete, the crystals and mother liquor are worked to a slurry, centrifuged and then dried at a temperature preferably above 150° C. to a free-flowing, finely-divided mass. During the separation of crystals from mother liquor, a product containing 30% NaOH is produced, and during the drying steps, approximately 15% to 20% by weight of water is driven off, providing an ultimate product containing about 12% water.

In order that the invention may be better understood, several examples illustrating the invention are provided as follows:

*Example I*

A liquor is prepared by combining about 151 grams of grade 42 silicate with about 199 grams of a 70% sodium hydroxide solution. This provides a liquor containing $Na_2O$ and $SiO_2$ in the ratio of approximately 3.94:1. These materials are thoroughly mixed at a temperature of about 95° C. and then cooled to about 86° C., at which temperature the mixture is held until crystallization is complete. The time for crystallization is about one hour. The mass is then stirred to form a slurry of the mother liquor and crystals and is thereafter centrifuged and dried. The resultant product is a free-flowing mass of small bodies averaging 1–2 mms. in diameter, analyzing 2 molecular parts $Na_2O$ to 1 molecular part $SiO_2$. It is highly soluble and substantially non-deliquescent.

*Example II*

A liquor is prepared and handled exactly as in Example I except that mixing is at about 122° C. and crystallization is allowed to take place by cooling at room temperature. Crystallization takes place as the temperature drops to below about 90° C. and is complete within about an hour. The product analyzes $2.02Na_2O:1SiO_2$ and is substantially identical to that of Example I.

*Example III*

A liquor is prepared and handled exactly as in the foregoing examples except that mixing is at about 100° C. and crystallization is allowed to take place for about an hour after first having been rapidly cooled to about 60°–65° C. The product so formed analyzes about 1.85Na$_2$O:1SiO$_2$ and exhibits substantially the same properties as the foregoing products.

*Example IV*

A liquor is prepared and handled as in the foregoing examples except that heating is to the boiling point (154° C.), after which the liquor is allowed to cool and crystallize at room temperature. The product analyzes 2.23Na$_2$O:1SiO$_2$ and has about the same properties as the foregoing products. Rapid cooling of an identically formed and handled liquor to about 60°–65° C. where crystallization takes place at about 70°–75° C. constant surrounding temperature for about an hour gives a similar product analyzing 1.87Na$_2$O:1SiO$_2$.

*Example V*

A liquor containing Na$_2$O and SiO$_2$ in the ratio of about 3.0:1 is prepared by combining grade 42 silicate and a 70% caustic soda solution. The materials are mixed at about 100° C. and, immediately thereafter, the mixture is seeded and allowed to crystallize at room temperature. After centrifuging and drying, the product analyzes 1.87Na$_2$O:1SiO$_2$ and is substantially identical to the foregoing products.

*Example VI*

A liquor containing Na$_2$O and SiO$_2$ in the ratio of about 5.0 is prepared by combining grade 42 silicate and a 70% caustic soda solution. The materials are mixed at about 100° C. and, immediately thereafter, the mixture is seeded and allowed to crystallize at room temperature. After centrifuging and drying, the product analyzes 1.93Na$_2$O:1SiO$_2$ and is substantially identical to the foregoing products.

*Example VII*

A liquor is prepared by combining 200 parts by weight of a silicate solution, containing by weight about 22.05% Na$_2$O, 21.55% SiO$_2$ and 56.40% H$_2$O, with 234 parts by weight 73% sodium hydroxide solution. The combination is accompanied by mixing and is heated to about 146° C. and then placed in a constant temperature (73° C.) bath to cool. Crystals begin to form after about 20 minutes and are complete a short time later. The mass is worked to a slurry in the mother liquor and is then centrifuged. The product analyzes about 1.93N$_2$O:1SiO$_2$ and possesses properties substantially identical to those of the foregoing examples.

It should be understood that the products of the foregoing examples differ slightly in crystal size, melting point, etc. However, all of them possess outstanding solubility and a higher melting point than products now known which are similarly described. For example, products according to this invention melt at as high as 2000° F. Additionally, the products are remarkably resistant to caking in moist atmosphere. Yields from the various examples run as high as 85–90% of the theoretical amount.

While it is believed that the process is adequately described by the foregoing, it is thought that some general observations made in the course of study of the process of the invention will be helpful to those interested in it and these are described in the following paragraphs.

X-ray studies of the products of the invention indicate their chemical composition as being combinations of sodium sesquisilicate and associated caustic in quantity to provide the additional Na$_2$O content. A typical analysis of the initial product is 49.1% Na$_2$O, 25.4% SiO$_2$, and when dried, the finished product may be stated as 57.1% Na$_2$O, 29.4% SiO$_2$ with the balance about 12% water, the quantities being by weight.

It appears that systems near 4.0Na$_2$O:1SiO$_2$ and at a total solids content of about fifty percent give best crystal growth and yield. Moreover, systems of about this initial content tend to give a higher ratio product, i. e., about 2Na$_2$O:1SiO$_2$.

It does not appear that the mixing rate or the temperature of mixing are critical, but it appears that better crystal growth is obtained if the temperature is adjusted to about 125°–135° C. just after mixing. Higher temperatures may result in fine crystals that are difficult to centrifuge.

Stirring and seeding of the liquor may speed up crystallization but, again, a mass that is quite fine sometimes forms. The liquors usually crystallize well at about 80° C. without assistance. However, experience with the particular formulations selected will provide the best technique to follow in these respects. Generally, agitation should not be continued after crystallization begins unless a very high ratio product is desired, i. e., 2.25:1 or higher. Products having the 1.85–2:10:1 ratio generally form by stopping agitation when crystallization starts, other conditions being observed.

Separation of crystals from the mother liquor in the centrifuge at temperatures under crystallization temperature, especially below about 65° C., increase the Na$_2$O content and, conversely, separation above crystallization temperature tends to reduce the Na$_2$O content, for example, to as low as about 1.65Na$_2$O:1SiO$_2$. Separation at about 65° to 80° C. is generally most satisfactory for producing a product having the near orthosilicate ratio.

Uniform temperature gradient throughout the crystallizing material tends to provide a more uniform product.

The liquor may be crystallized in a continuous manner, as by deposition upon an endless belt. Also, it may be cast in pans as relatively thin layers. Both of these methods, if properly controlled, tend to uniform crystallizing conditions throughout the entire body of material.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for forming crystalline, sodium silicate noncaking in a moist atmosphere, having a melting point of the order of 2000° F., and having an Na$_2$O:SiO$_2$ ratio within the range from approximately 1.65:1 to 2.25:1 comprising mixing a sodium hydroxide solution having a concentration within the range from about 55 to about 74% NaOH with a sodium silicate solution having an Na$_2$O:SiO$_2$ ratio within the range from approximately 1:1 to 1:3.4, the sodium silicate and sodium hydroxide being in quantities calculated to produce a reaction mixture having an Na$_2$O:SiO$_2$ ratio of at least about 3:1, heating said mixture to at least about 90° C., cooling the mixture to a temperature within the range from about 65 to about 90° C. and holding the mixture at a temperature within said range until crystallization is substantially complete, separating the crystals of high melting point sodium silicate from the mixture, and heat-drying the same.

2. A process as claimed in claim 1 wherein said sodium silicate solution and said sodium hydroxide are combined in proportions to produce an Na$_2$O:SiO$_2$ ratio of between about 3:1 and 6:1.

3. A process as claimed in claim 1 wherein said sodium hydroxide solution has a concentration of about 70% to 73%.

4. A process as claimed in claim 3 wherein said sodium silicate solution comprises Na$_2$O and SiO$_2$ in the ratio of 1 to about 3.22 parts by weight.

5. A process as claimed in claim 4 wherein said sodium silicate solution and said sodium hydroxide solution are combined in proportions to produce an Na$_2$O:SiO$_2$ ratio of about 4:1.

6. A process for forming crystalline, technically anhydrous sodium silicate noncaking in a moist atmosphere, having a melting point of the order of 2000° F., and having an $Na_2O:SiO_2$ ratio within the range from approximately 1.65:1 to 2.25:1 comprising mixing a sodium hydroxide solution having a concentration within the range from about 55 to about 74% NaOH with a sodium silicate solution having an $Na_2O:SiO_2$ ratio within the range from approximately 1:1 to 1:3.4, the sodium silicate and sodium hydroxide being in quantities calculated to produce a reaction mixture having an $Na_2O:SiO_2$ ratio of at least about 3:1, heating said mixture to at least about 90° C., cooling the mixture to a temperature within the range from about 65 to about 90° C. and holding the mixture at a temperature within said range until crystallization is substantially complete, separating the crystals of high melting point sodium silicate from the mixture, and heat-drying the same.

7. A process as claimed in claim 6 wherein said sodium silicate solution and said sodium hydroxide are combined in proportions to produce an $Na_2O:SiO_2$ ratio of between about 3:1 and 6:1.

8. A process as claimed in claim 6 wherein said sodium hydroxide solution has a concentration of about 70% to 73%.

9. A process as claimed in claim 8 wherein said sodium silicate solution comprises $Na_2O$ and $SiO_2$ in the ratio of 1 to about 3.22 parts by weight.

10. A process as claimed in claim 9 wherein said sodium silicate solution and said sodium hydroxide solution are combined in proportions to produce an $Na_2O:SiO_2$ ratio of about 4:1.

11. A process as claimed in claim 10 wherein said mixture is heated to between about 100° and 135° C. and said crystals after separation are dried to a free-flowing particulate mass.

12. A process for forming crystalline, alkali metal silicate noncaking in a moist atmosphere, having a melting point of the order of 2000° F., and having an alkali metal oxide:$SiO_2$ within the range from approximately 1.65:1 to 2.25:1 comprising mixing an alkali metal hydroxide solution having a concentration within the range from about 55 to about 74% NaOH with an alkali metal silicate solution having an alkali metal oxide:$SiO_2$ ratio within the range from approximately 1:1 to 1:3.4, the alkali metal silicate and alkali metal hydroxide being in quantities calculated to produce a reaction mixture having an alkali metal oxide:$SiO_2$ ratio of at least about 3:1, heating said mixture to at least about 90° C., cooling the mixture to a temperature within the range from about 65° to about 90° C. and holding the mixture at a temperature within said range until crystallization is substantially complete, separating the crystals of high melting point alkali metal silicate from the mixture, and heat-drying the same.

13. A process for forming crystalline, technically anhydrous alkali metal silicate noncaking in a moist atmosphere, having a melting point of the order of 2000° F., and having an alkali metal oxide:$SiO_2$ ratio within the range from approximately 1.65:1 to 2.25:1 comprising mixing an alkali metal hydroxide solution having a concentration within the range from about 55 to about 74% NaOH with an alkali metal silicate solution having an alkali metal oxide:$SiO_2$ ratio within the range from approximately 1:1 to 1:3.4, the alkali metal silicate and alkali metal hydroxide being in quantities calculated to produce a reaction mixture having an alkali metal oxide:$SiO_2$ ratio of at least about 3:1, heating said mixture to at least about 90° C., cooling the mixture to a temperature within the range from about 65 to about 90° C. and holding the mixture at a temperature within said range until crystallization is substantially complete, separating the crystals of high melting point alkali metal silicate from the mixture and heat-drying the same.

14. A crystalline alkali metal silicate noncaking in a moist atmosphere, having a melting point of the order of 2000° F., and having an alkali metal oxide:silicon dioxide ratio within the range from approximately 1.65:1 to 2.25:1, said silicate having an X-ray diffraction pattern characteristic of alkali metal sesquisilicate and associated alkali metal hydroxide.

15. A crystalline sodium silicate noncaking in a moist atmosphere, having a melting point of the order of 2000° F., and having an $Na_2O:SiO_2$ ratio within the range from approximately 1.65:1 to 2.25:1, said silicate having an X-ray diffraction pattern characteristic of sodium sesquisilicate and associated sodium hydroxide.

References Cited in the file of this patent
UNITED STATES PATENTS

| | | |
|---|---|---|
| 1,953,840 | Waddell | Apr. 3, 1934 |
| 2,131,718 | McDaniel | Sept. 27, 1938 |
| 2,153,872 | McDaniel | Apr. 11, 1939 |
| 2,206,289 | McDaniel | July 2, 1940 |

OTHER REFERENCES

Vail: "Soluble Silicates," vol. I, Monograph Series No. 116, 1952, pages 30, 32, 112. Reinhold Publishing Co., N. Y. C.

UNITED STATES PATENT OFFICE

CERTIFICATE OF CORRECTION

Patent No. 2,840,456                                              June 24, 1958

William T. Gooding, Jr.

It is hereby certified that error appears in the printed specification of the above numbered patent requiring correction and that the said Letter Patent should read as corrected below.

Column 5, line 45, after "about" strike out "$1.93N_2O:1SiO_2$" and insert instead -- $1.93Na_2O:1SiO_2$ --; column 7, line 40, after "oxide:$SiO_2$" insert -- ratio --.

Signed and sealed this 9th day of September 1958.

(SEAL)
Attest:

KARL H. AXLINE                                           ROBERT C. WATSON
Attesting Officer                                     Commissioner of Patents